L. I. THOMPSON.
VEHICLE SPRING.
APPLICATION FILED OCT. 21, 1919.
1,374,780.
Patented Apr. 12, 1921.
2 SHEETS—SHEET 2.
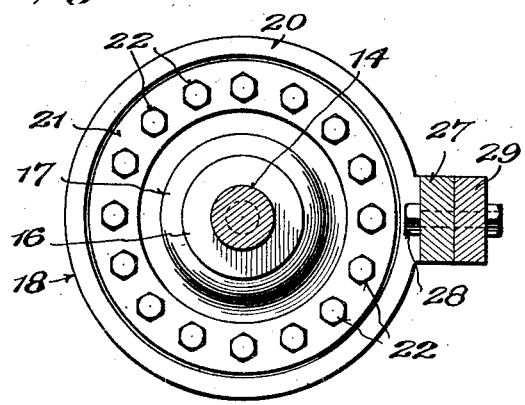
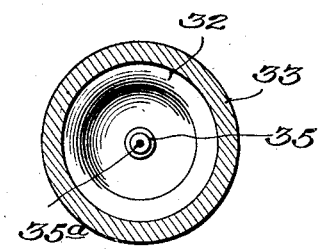
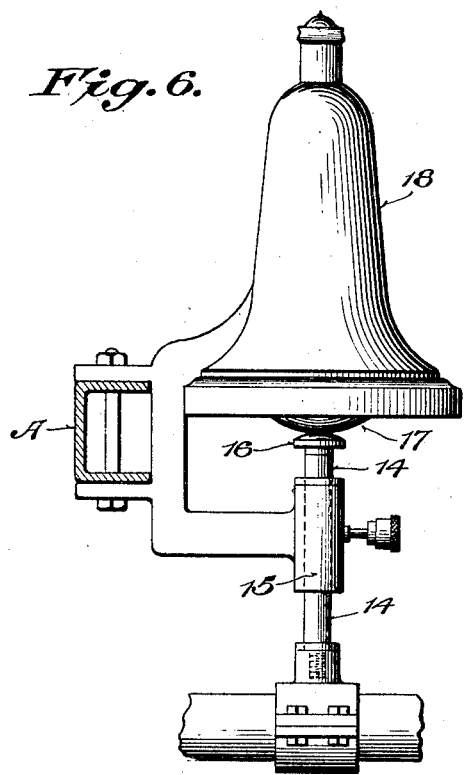
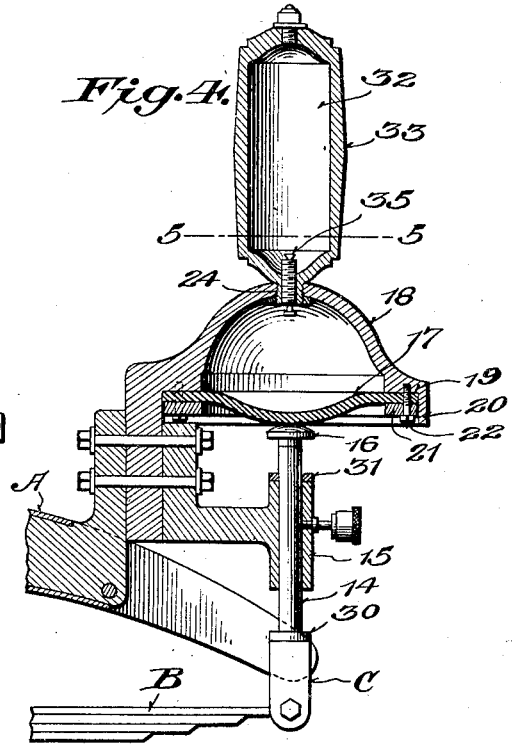
Inventor
Lewis Irving Thompson,
By Royal E. Burnham,
Attorney
Witness
Chas. R. Grieshauer

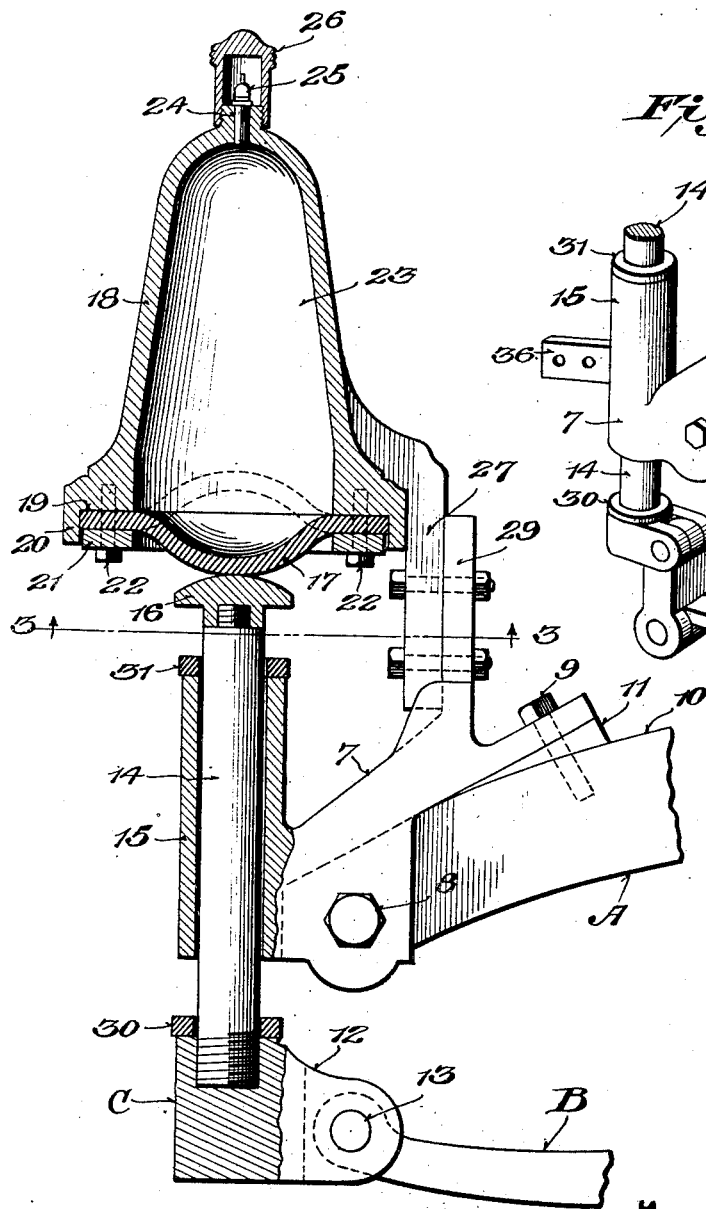

UNITED STATES PATENT OFFICE.

LEWIS IRVINE THOMPSON, OF PORTLAND, OREGON.

VEHICLE-SPRING.

1,374,780.  Specification of Letters Patent.  Patented Apr. 12, 1921.

Application filed October 21, 1919. Serial No. 332,134.

*To all whom it may concern:*

Be it known that I, LEWIS IRVINE THOMPSON, a citizen of the United States, residing at Portland, in the county of Multnomah and State of Oregon, have invented certain new and useful Improvements in Vehicle-Springs, of which the following is a specification, reference being had therein to the accompanying drawings.

This invention relates to a vehicle-spring that includes a pneumatic cushioning device. While it is adapted particularly for installation on motor-vehicles, it also is susceptible to use with other types of vehicles.

The cushioning device comprises an air-chamber having a resilient diaphragm at one end thereof so associated with a vehicle that it sustains the weight thereof, is sensitive to movements of the running-gear resulting from irregularities in the roadway, and will absorb shocks as a result of action of air in the chamber.

The arrangement is such that the diaphragm has comparatively little resistance to vibrations in the running-gear when traveling over a fairly smooth roadway and the resistance increases in accordance with increase in the stresses of vibration.

One embodiment of the invention includes an auxiliary air-chamber in communication with the main air-chamber and having associated therewith a check-valve permitting air to pass freely from the main to the auxiliary chamber and restricting its return to the main chamber, whereby violent rebounds are avoided.

The cushioning device has no cross-head, piston or cylinders and the diaphragm is a continuous sheet of strong, laminated, resilient, inelastic fabric, which is not penetrated at any point and thus is less susceptive of wear and breaking and tearing action than those forms having an orifice or passageway for accommodation of a bolt or the like or other part.

The parts of the device are so formed and arranged that installation thereof on a motor-vehicle can be made with slight change of the vehicle parts.

When read in connection with the description herein, the details of construction and arrangement of parts contemplated by the invention will be apparent from the accompanying drawings, forming part hereof, wherein embodiments of the invention are disclosed, for purposes of illustration.

While the disclosures herein exemplify what now are considered to be preferable embodiments of the invention, it is to be understood that it is not the intention to be limited necessarily thereto in interpretation of the claims, as modifications and adaptations within the limits of the claims can be made without departing from the nature and spirit of the invention.

Like reference-characters refer to corresponding parts in the views of the drawings, of which—

Figure 1 is a side elevation, partly in section; the device being shown as mounted in the front portion of a motor-vehicle;

Fig. 2 is a view of a similar form of mounting adapted for installation at the rear of a vehicle;

Fig. 3 is a bottom view of the diaphragm;

Fig. 4 is a vertical sectional view of the two-chamber form;

Fig. 5 is a sectional view on the line 5—5, Fig. 4; and

Fig. 6 is a view of the device directly connected to an axle.

Having more particular reference to the drawings, A designates a vehicle-frame member and B one of the leaf-springs upon which that member is mounted and by which it is supported on an axle, these parts being such as are commonly present in motor-vehicles. Ordinarily each end of such a spring is connected non-resiliently to the frame member, as by a shackle member, the spring being connected intermediately of its ends to the axle.

The invention interposes resilient means between one end of the spring and the frame member, which is so arranged that it will prevent shocks or stresses sustained by the running-gear from being communicated to the body or other load. Although the device is intended primarily for association with a metallic spring, such as the leaf-spring shown in the drawings, it also can be connected with a non-resilient arm mounted like a leaf-spring, or it may be connected directly to an axle as a support for the frame as illustrated by Fig. 6.

For the purpose of mounting the device on the end of a frame member, a shoe 7 is provided that is adapted to fit over the end of the frame member where a metallic leaf-spring has been connected at one end. The shoe is held on the frame member by a bolt or other suitable fastening 8, which may be passed through the hole that has been occupied by the spring-holding pintle, and by a bolt or the like 9 extending through the shoe into the web 10 of the frame member. In case the under side of the shoe, which abuts the upper side of the frame member, does not conform in shape to the latter, a filling-block 11 may be interposed between the two parts.

The end of the spring, instead of being connected at its usual place at the end of the frame member, is connected by its pintle 12 in a shackle 13.

An elongated member 14 extends from the shackle through and is reciprocable in a guideway 15 on the free end portion of the shoe 7. The member 14 has on its end opposite to the shackle an enlarged rounded head 16 that normally bears against a circular diaphragm 17. The diaphragm and the member 14 are coaxial.

The diaphragm closes the open end of a bell-shaped metallic casing 18, and its peripheral portion is held against a seat 19 inside of an annular rim 20 by a ring 21 forced and maintained against the outside of the diaphragm by machine-screws or other suitable fastenings 22 extending into the casing, a fluid-tight joint thus being afforded between the casing and the diaphragm. With the diaphragm thus in place, a fluid-tight air-chamber 23 is provided in the casing.

The casing has a passage 24 affording communication between the exterior and the interior thereof; this passage is equipped with a valve 25 arranged to prevent escape of air and operable to permit air to be forced into and to escape from the chamber, types of such a valve being in common use in association with pneumatic tires; and the valve is covered by a removable cap 26.

The casing is mounted by having an integral extension 27 thereof secured by bolts 28 to a flange 29 of the shoe.

The diaphragm is formed of a sheet of strong, laminated or other suitable fabric that is resilient, non-elastic, and impervious to the passage of air therethrough. It normally is concavo-convex in shape with its convex side abutting and tangential to the head 16 of the member 14, the curve of which head is opposite to that of the diaphragm. Air is maintained in the chamber 23 under sufficient pressure to keep the diaphragm in its maximum distended condition under normal load imposed on the end of the spring or other member connected with the shackle 13 while the vehicle is at rest.

Under these conditions, the area of contact of the rounded head 16 and rounded diaphragm is small, and thus the diaphragm is sensitive to and is pressed slightly inward against the resilient fluid in the chamber in response to moderate vibrations or stresses in the running-gear such as occur when the vehicle is traversing a comparatively smooth roadway.

When vibrations, shocks, or stresses sustained by the running-gear become greater in extent or force and the range of movement of the elongated member 14 and its head 16 increases, there is a corresponding increase in the area of contact of the head and diaphragm and of compression of the diaphragm, and the pressure of the fluid in the chamber and its resistance to movement of the weight-sustaining member 14 increases in accordance therewith. Thus it will be seen that the device is sufficiently sensitive to absorb slight vibrations and automatically increases its resistance to vibrations, shocks, or stresses in accordance with the force thereof.

In order to avoid imposition of pressure on the diaphragm beyond what would result in maximum compression thereof to the position indicated by dotted lines in Fig. 1, the range of compression movement is limited by abutments afforded by the shackle 13 and the lower end of the guideway 15, between which parts is interposed a buffer 30, which is preferably in the form of a comparatively soft washer. The parts are so proportioned that the abutments will contact against the buffer just before the diaphragm has reached its maximum limit of compression.

Ordinarily there will not be sufficient rebound from compression of the diaphragm to remove it from contact with the head 16. If such action does occur, however, it will be limited by the head and the upper end of the guideway, between which is disposed a buffer 31 similar to the buffer 30.

Air may be forced into the chamber through the passage 24 to compensate for lost pressure due to leakage or to increase the resistance of the diaphragm when abnormal load is to be imposed on the vehicle; and, of course, when pressure is at any time greater than that desired, it may be reduced by releasing air through the valve 25.

The embodiment of the invention so far described meets the usual requirements of vehicles operated under conditions ordinarily encountered and with which violent reactions from compression of the diaphragm are not of common occurrence.

However, in order to meet the conditions incident to violent or abnormally forcible compression of the diaphragm, sometimes to the maximum limit, it is desirable to retard the action of the air in returning the diaphragm to distended condition and thus lessen the force of the rebound, and it is for this purpose that the form disclosed by Figs. 4 and 5 is provided.

In this form, an auxiliary air-chamber 32, in communication with the main chamber, is provided. The auxiliary chamber is contained in a casing 33, which may be connected in any suitable manner with the chamber 23. For example, the casing 33 may be formed with a threaded opening 34 adapted to be screwed into the threaded portion of the casing 18 provided for the valve-cap 26. A valve 35 is positioned in the passage between the two chambers, it is arranged to open and to permit the free passage of air from the main to the auxiliary chamber when pressure in the former exceeds that in the latter and to close against flow of air in the opposite direction, and it has a restricted passage 35ª through which air may return more slowly to the main chamber.

While uniform pressure is maintained by the head 16 against the diaphragm, pressure in the two chambers is equal. When pressure on the diaphragm that has resulted in its compression is suddenly decreased, only the air in the main chamber will act at once expansively to distend the diaphragm, and the power that has been stored by compression of air in the auxiliary chamber will act more slowly by reason of the restricted flow through the valve-passage 25ª. Thus the rebound action of the device is slower and less forcible than in the other form in which all of the expansive force in the air is exerted at once to distend the diaphragm when external pressure is lessened.

The member 14 has been described as being connected with a metallic spring. However, in some cases the pneumatic spring may afford sufficient resiliency to meet the requirements. Then the shackle 13 would be connected with a rigid arm or other part corresponding to the leaf-spring shown; or the member 14 could be connected directly to the axle, for example as shown by Fig. 6.

The shoe 7, together with its web, guideway 15, and flange 29 ordinarily is a unitary casting; and, if desired, the casting may be formed with a lug 36 extending from the guideway to afford one of the mountings of a buffer.

Having thus described my invention, what I claim as new, and desire to secure by Letters Patent, is—

1. In a vehicle, the combination, with a frame member and an axle, of a shoe enveloping an end of and secured to said frame member, a casing containing a compressed-air chamber mounted on said shoe, a continuous sheet-material flexible diaphragm normally exteriorly convex constituting an air-tight closure for said chamber, a guideway coaxial with said diaphragm carried by said shoe, and an element reciprocatory in said guideway connected with said axle.

2. A vehicle-spring comprising a shoe arranged to envelop an end of a vehicle part, a casing containing a compressed-air chamber mounted on said shoe, a flexible diaphragm constituting an air-tight closure for said chamber, a guideway carried by said shoe, and an element in said guideway reciprocable against said diaphragm arranged to be connected with another vehicle part.

3. A unitary article for mounting parts on a vehicle, comprising a shoe arranged to envelop an end of a frame member and having a flange for supporting a spring thereon, a guideway for a reciprocable spring-coacting member, and a lug on said guideway adapted for use as a buffer-support.

In testimony whereof I affix my signature.

LEWIS IRVINE THOMPSON.